E. C. SHAW.
VEHICLE WHEEL RIM.
APPLICATION FILED MAY 25, 1907.
971,318.
Patented Sept. 27, 1910.
2 SHEETS—SHEET 1.
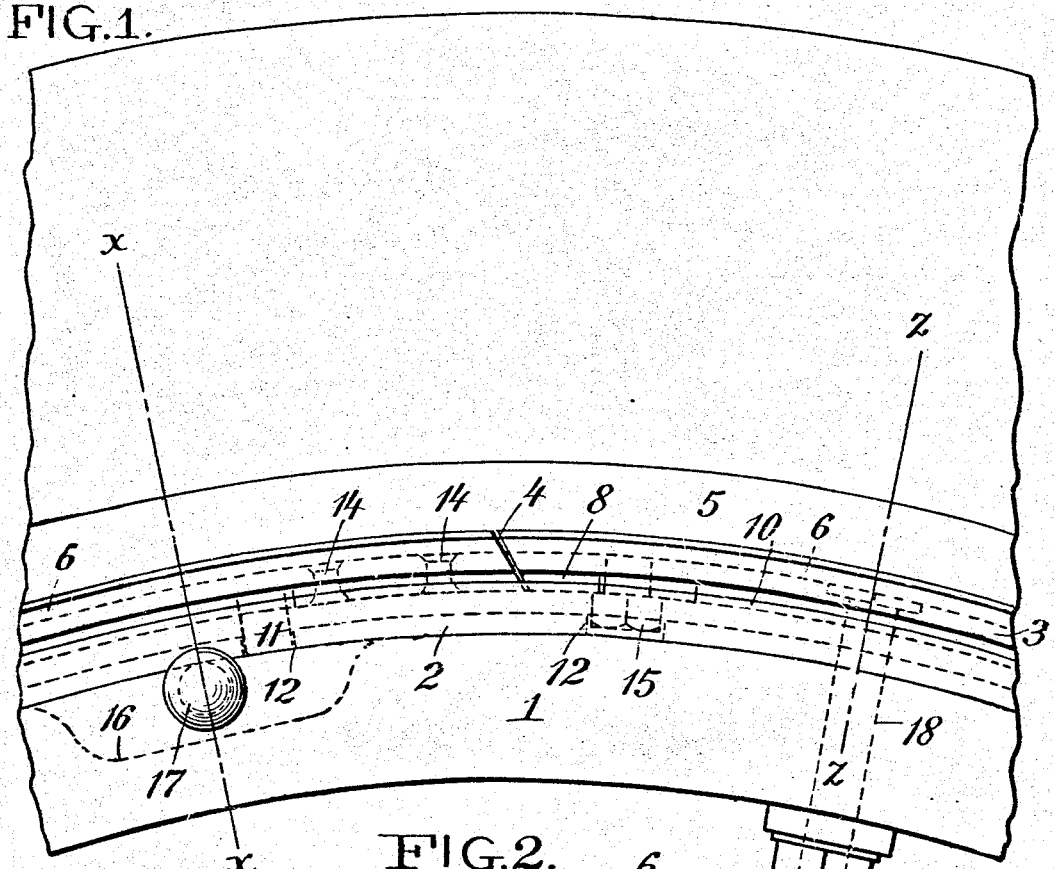
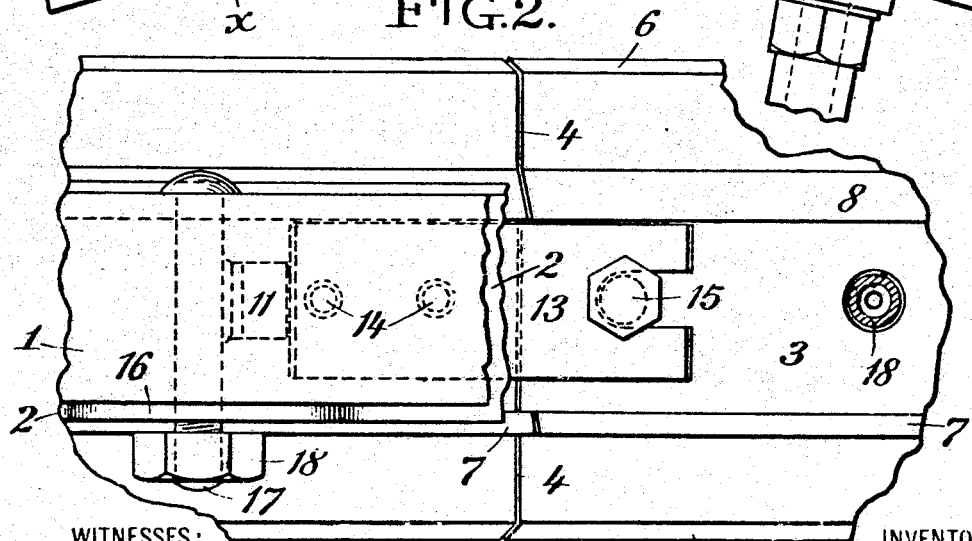

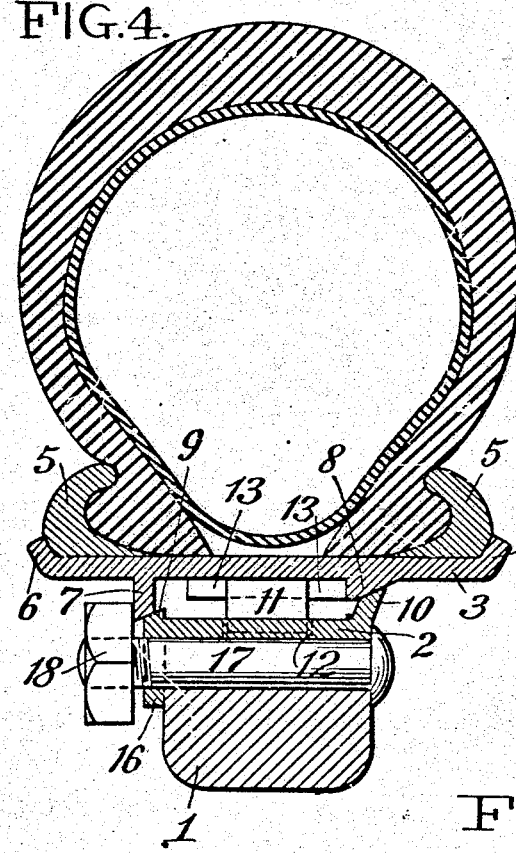
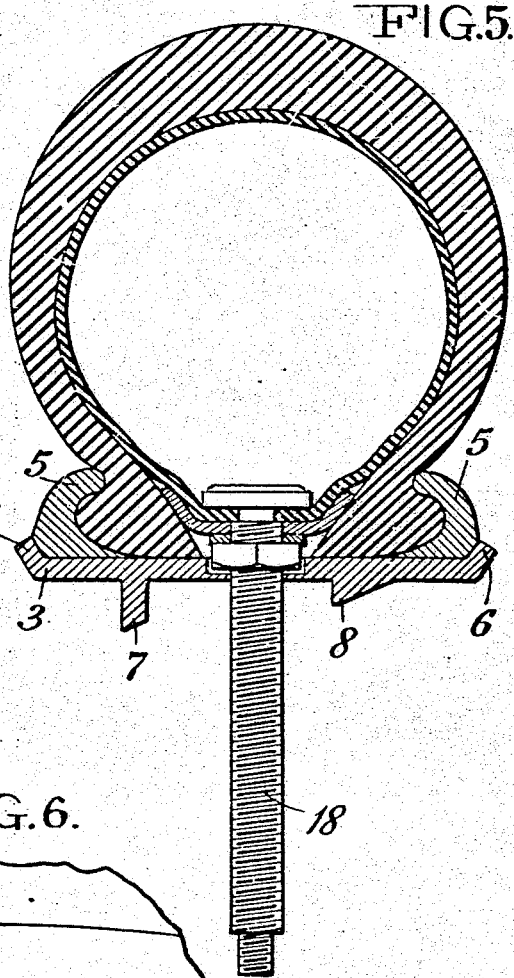
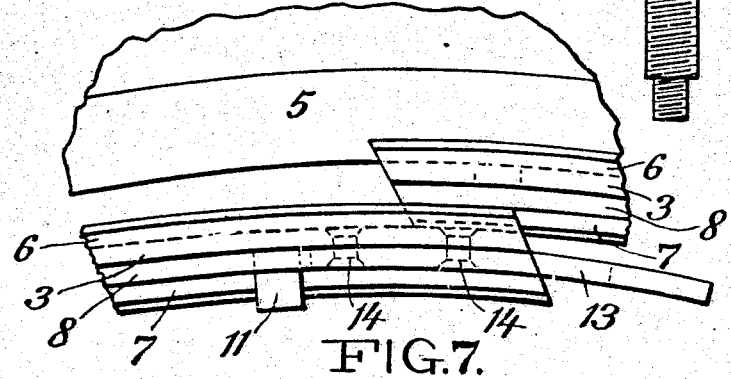
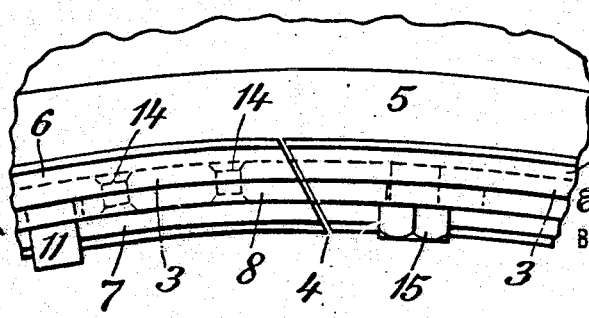

UNITED STATES PATENT OFFICE.

EDWIN COUPLAND SHAW, OF AKRON, OHIO, ASSIGNOR, BY MESNE ASSIGNMENTS, TO THE UNITED RIM COMPANY, OF AKRON, OHIO, A CORPORATION OF OHIO.

VEHICLE-WHEEL RIM.

BEST AVAILABLE COPY

971,318.

Specification of Letters Patent. Patented Sept. 27, 1910.

Application filed May 25, 1907. Serial No. 375,718.

*To all whom it may concern:*

Be it known that I, EDWIN COUPLAND SHAW, a citizen of the United States, and a resident of the city of Akron, in the county of Summit and State of Ohio, have invented certain new and useful Improvements in Vehicle-Wheel Rims, of which the following is a specification, reference being had to the drawings forming a part thereof.

My invention relates to that class of vehicle wheel rims adapted for use with tires of resilient material.

It particularly relates to rims upon which a resilient tire can be detachably mounted, and to rims which can be applied to and detached from the wheel felly at will.

It has for its especial objects the provision of means in the same wheel rim whereby not only can the tire be quickly and easily attached thereto or detached therefrom, but also the rim itself can be readily attached to and quickly detached from a wheel felly.

Wheel rims have heretofore been devised intended to facilitate the detachable attachment of tires thereto; other rims have been devised intended to be detachably affixed to the wheel felly; with my improved construction I have attained the combination of both of these desired ends in a single structure. My rim is a medium of rapid and ready attachment and detachment common alike to tire and felly, and is capable of attaining these advantages with each. I attain these objects primarily by employing a split ring and endless tire-retaining flanges or rings mounted thereon, and by the construction and means hereinafter described, whereby the rim is capable of contracting to receive the tire and expansion to retain it, and the self-contained structure resulting is itself capable of quick and positive attachment to the wheel felly by wedging engagement therewith.

My improved rim is not restricted in its field of usefulness to any particular class of tires, nor to any particular type of fellies, as will be apparent to those skilled in the art. It has been here illustrated as applied to pneumatic tires but it will be readily understood that without departing from the spirit of this disclosure it may be adapted to solid or cushion tires with equal advantage. In the class of pneumatic tires, the clencher type has been chosen for illustration; but my improvement can be applied, as is obvious, to any other type of the class, as for example, to the Dunlop tire, by simple modifications of the means shown.

Among the advantages attainable with my improved rim is that of a self-contained tire, whereby an injured tire or rim may be rapidly replaced with a sound tire, or a deflated tire by an inflated one. As an illustration of its advantage, it may be noted that in automobile practice it is customary to carry a spare tire to replace one that may become unserviceable. Under present methods, in case the tire to be replaced is a pneumatic one, the tire must be removed from the rim, another set in its stead, and thereafter, inflated. By my invention the spare tire may be transported already inflated and mounted upon its rim, as a self-contained structure ready for instant setting, in lieu of the damaged tire and its rim. The rim's construction facilitates the substitution of another tire upon it, and its inflation, in transit. The delay incident to inflation of a tire after setting is obviated by the substitution of a tire that is ready to run. As time is often an element of material value, as in races, the use of my self-contained tire thus avoids a serious handicap. Other features of advantage are the ease and convenience of handling when the tire has to be removed from the rim, enabling this to be done rapidly and without any special tools or appliances, or extra parts; a saving of the wear upon the tire case which is incident to the use of tire tools upon inextensible fabric; the simplification of means of attachment, both of the tire to the rim and the rim to the felly; a positive engagement of each to the other, and a positive disengagement of each from the other; and the avoidance of conditions liable to injure the inner tube, when changes are made, as by the collection of dirt or moisture in the tire case when the change is made slowly or under difficult conditions of road work.

Other features of advantage inherent in the construction of my improved rim are illustrated in the accompanying drawings in which is shown one of several means of practicing my invention as applied to pneumatic tires of the clencher type.

In the drawings Figure 1 shows a section of a pneumatic tire of the clencher type upon a removable split rim mounted upon a fixed rim on the wheel felly. Fig. 2 shows the inside of the detachable split rim, with parts of the fixed rim and felly broken away, showing the bridge piece locking the split rim in its normal position, and also showing the means for attaching the split rim to the fixed rim and the fixed rim to the felly. Fig. 3 is a longitudinal sectional view of the split rim bridge piece and fixed rim. Fig. 4 is a transverse sectional view on the line X—X of Fig. 1. Fig. 5 is a transverse sectional view on the line Z—Z of Fig 1, the fixed rim, felly, and valve cap being omitted. Fig. 6 is a view in elevation showing the split rim contracted by overlapping its ends to permit the annular tire flanges and tire to be mounted thereon. Fig. 7 is a like view showing the detachable split rim expanded to its normal position and locked therein.

These drawings illustrate specific forms of annular tire retaining flanges, detachable and fixed rim, and means for promoting the wedging engagement between the removable and the fixed rim. These several elements and their accessories may be variously modified so long as their several respective functions are performed relatively to each other, without altering the respective combination of elements; for example, the removable rim and the fixed rim may be of a number of forms in cross section so long as they are so constructed that they are adapted to coöperate in mutual wedging engagement. The removable rim itself may be adapted in many ways to retain the endless tire retaining flanges mounted upon it, depending upon the forms of these flanges in section, which in turn will be varied to correspond to the tire to be retained. The essential feature of the detachable rim is that it shall be a split rim, and of the tire retaining flanges that they shall be endless. Similarly the means of permitting the wedging engagement between the detachable rim and the fixed rim may be varied, and in like manner the means for maintaining the split rim in its normal position admits of many modifications.

Throughout the several figures like reference numerals are used to indicate the same parts.

The detail of the several views is as follows: 1 is a wheel felly; 2 is a fixed rim mounted thereon; 3 is a detachable rim transversely split at 4 to permit its expansion and contraction; 5 are endless tire retaining flanges mounted upon rim 3 and held against laterally outward movement by the flanges 6, 6 formed integrally upon the removable rim 3. The detachable rim 3 has formed integrally with it downwardly extending annular flanges 7 and 8 adapted to engage with upwardly projecting annular flanges 9 and 10 formed upon the fixed rim 2 as shown in Fig. 4. Formed upon the detachable rim 3 is the inwardly projecting lug 11 adapted to seat in the slot 12 in the fixed rim. The detachable rim also carries a bridge piece 13, one end of which is riveted thereto by the rivets 14, 14 and the other end of which projects beyond the split 4 in the rim 3 and has formed in its extremity a slotted recess adapted to receive the bolt 15, the fixed rim having a slot therethrough to permit the entry of the bolt's head therein. The fixed rim is attached to the felly by any suitable means. Disposed at suitable intervals it has downwardly extending ears 16 overlying the outer side of the felly, which are drilled to receive bolts 17 passing therethrough and through the felly. These bolts are screw-threaded to receive the nuts 18. In the construction here illustrated the flange 7 has a downward and outward inclined face corresponding to the incline of the flange 9, which is a downwardly beveled taper, while the flange 8 has an inwardly and downwardly inclined face adapted to correspond to the upwardly and outwardly inclined bevel of the flange 10, which is itself slightly inclined.

The method of operation of my improved rim is as follows: The split detachable rim 3 is contracted as shown in Fig. 6 so that its ends overlap. Its diameter being thus contracted, the inner tire retaining flange 5 is passed over it and positioned against the inner rim 6. The tire may be then passed readily over the contracted rim, the valve stem 18 being first passed through a hole provided therefor in the detachable rim, and the outer tire flange 5 positioned thereupon within and against the outer rim flange 6. The rim 3 is then allowed to expand and the bolt at 15 is turned up locking the bridge piece 13 under its head thus retaining the extended rim in its normal position as shown in Fig. 3. The tire is then inflated and by its inflation locks itself against the annular tire retaining flanges 5, 5 upon the detachable rim 3. The tire and rim thus present a self-contained structure adapted to be carried as such ready for service.

The method of attachment of this structure to the felly is as follows: The valve stem projecting through the detachable rim is first passed through the hole in the fixed rim and felly provided therefor and the lug 11 seated in its corresponding slot 12 and the head of bolt 15 in its corresponding slot in the fixed rim. The detachable rim is then positioned with the inclined faces of its lugs resting upon the inclined faces of the corresponding lugs upon the fixed rim and the nuts 18 are placed upon the bolts 17 and turned down thereby wedging the detachable rim upon the fixed rim, the slot in the bridge-piece 13 permitting it to slide beneath the head of bolt 15 as the detachable rim is expanded against the annular tire retaining flanges 5 until they limit the motion of the detachable rim. To remove the detachable rim the operation is reversed, the nuts 18 being removed, the detachable rim at the side opposite the valve stem is first slid off the fixed rim when the rim and tire mounted thereon may be lifted from the fixed rim. To remove the tire from the rim the bolt 15 is withdrawn and the rim contracted as shown in Fig. 6 when the outer annular tire retaining flange may be lifted off and the tire removed from the detachable rim, the side opposite the valve stem being first freed, when the tire may be lifted upwardly, the valve stem passing through the slot in the rim.

Having thus described my invention I claim:

1. The combination of a detachable split rim, endless tire retaining flanges thereon, and means for locking said rim against said flanges.

2. The combination of a detachable split rim, endless tire-retaining flanges thereon and means for expanding said rim into engagement with said flanges.

3. The combination of a resilient tire, an expansible rim therefor, removable annular tire-retaining flanges upon said rim, means for expanding said rim and means for locking it when expanded.

4. The combination of a detachable split rim, means mounted thereon for retaining one side of a tire, and an endless tire-retaining flange for retaining the other side of a tire removably mounted on said rim.

5. The combination of a detachable rim comprising a transversely split ring having upturned extremities forming flanges, and detachable annular tire-retaining flanges seated upon said rim.

6. The combination in a vehicle wheel rim of a detachable rim comprising a transversely split ring adapted to be expanded and having upturned extremities forming flanges, detachable annular tire-retaining flanges seated upon said rim and within said upturned extremities adapted to limit the said expansion, two downwardly projecting flanges from said rim; a fixed rim mounted upon the wheel felly, two upwardly projecting flanges thereupon adapted to engage the flanges on the detachable rim, and adapted to prevent its lateral displacement in one direction; and means for securing a wedging engagement between said pairs of flanges, adapted to prevent lateral displacement of said removable rim in the other direction.

7. In a wheel rim, the combination of a felly, a rim fixed thereto, and a detachable split rim adapted to be expanded, the latter adapted to seat upon the former, detachable annular tire retaining flanges seated upon said rim adapted to limit the expansion of said detachable rim, two flanges projecting downward from said detachable rim, the faces of said flanges being beveled in the same direction, two flanges projecting upward from said fixed rim having their faces beveled to engage the faces of the downwardly projecting flanges, bolts passing through the wheel felly and nuts on the bolts engaging with one of the downwardly projecting flanges to force said rims into wedging contact and expand said detachable rim.

8. The combination of a wheel having a plurality of surfaces comprising frustums of concentric cones so related to each other that an extension of the conical surface of the larger frustum will lie within the conical surface of the other frustum, of a detachable pneumatic tire carrying rim having coacting beveled surfaces adapted to contact with the surfaces on said wheel, and means for securing said detachable rim to said wheel, substantially as described.

9. The combination of a wheel having a plurality of separated surfaces comprising frustums of concentric cones so related to each other that an extension of the conical surface of the larger frustum will lie within the conical surface of the other frustum, of a detachable pneumatic tire carrying rim having co-acting beveled surfaces adapted to contact with the surfaces on said wheel, and means for securing said detachable rim to said wheel, substantially as described.

10. The combination with a wheel having a plurality of axially separated surfaces comprising frustums of concentric cones and so related to each other that an extension of the conical surface of the larger frustum will lie within the conical surface of the other frustum, of a detachable pneumatic tire carrying rim having axially separated co-acting engaging surfaces, a bolt passing through the wheel, and means regulated by said bolt for engaging the side of the rim for clamping it to the wheel.

11. The combination of a wheel having a plurality of beveled surfaces forming parts of different cones, of a detachable pneumatic tire carrying rim having coacting beveled surfaces adapted to contact with the surfaces on said wheel, and means for securing said detachable rim to said wheel, substantially as described.

12. The combination of a wheel having a plurality of separated beveled surfaces forming frustums of different cones, of a detachable pneumatic tire carrying rim having coacting contact surfaces adapted to contact with the respective surfaces on said wheel, and means for securing said detachable rim to said wheel, substantially as described.

13. The combination with a wheel having axially separated beveled projections comprising frustums of different cones, of a detachable pneumatic tire carrying rim having axially separated coacting engaging surfaces, a bolt passing through the wheel, and means regulated by said bolt for engaging the side of the rim for clamping it to the wheel.

14. A removable rim for wheels, embodying at the outer side thereof a pair of flanges for holding a rubber tire between them and also embodying at the inner side thereof a ring having a pair of laterally-separated bearing surfaces disposed at different distances from, and constituting the nearest bearing surfaces in said ring to, the axis of the wheel.

15. A removable rim for wheels, embodying at the outer side thereof a pair of flanges for holding a rubber tire between them and also embodying at the inner side thereof a ring having a pair of laterally-separated annular bearing surfaces disposed at different distances from, and constituting the nearest bearing surfaces in said ring to, the axis of the wheel.

16. A removable rim for wheels, embodying at the outer side thereof a pair of flanges for holding a rubber tire between them and also embodying at the inner side thereof a ring having a pair of laterally-separated bearing surfaces disposed at different distances from, and at least one of which is oblique to, the axis of the wheel, and constituting the nearest bearing surfaces in said ring to said axis.

17. A removable rim for wheels, embodying at the outer side thereof a pair of flanges for holding a rubber tire between them and also embodying at the inner side thereof a ring having a pair of laterally-separated annular bearing surfaces disposed at different distances from and at least one of which is oblique to the axis of the wheel, and constituting the nearest bearing surfaces in said ring to said axis.

18. A wheel comprising fixed and removable rings the latter of which constitutes a removable rim embodying at its outer side a pair of flanges for holding a rubber tire between them, said rings having as their only lateral stop-faces laterally-separated pairs of complementary bearing surfaces disposed at different distances from the axis of the wheel.

19. A wheel comprising fixed and removable rings the latter of which constitutes a removable rim embodying at its outer side a pair of flanges for holding a rubber tire between them, said rings having as their only lateral stop-faces laterally separated pairs of complementary bearing surfaces at least one bearing surface of each pair being oblique to the axis of the wheel and each oblique surface extending in the same general direction.

20. A wheel comprising fixed and removable rings the latter of which constitutes a removable rim embodying at its outer side a pair of flanges for holding a rubber tire between them, said rings having as their only lateral stop-faces laterally-separated pairs of complementary bearing surfaces disposed at different distances from the axis of the wheel, at least one bearing surface of each pair being oblique to the axis of the wheel and each oblique surface extending in the same general direction.

EDWIN COUPLAND SHAW.

Witnesses:
ARTHUR E. DAVISON,
WALTER K. MEANS.